(12) United States Patent
Hennon

(10) Patent No.: US 9,033,289 B2
(45) Date of Patent: May 19, 2015

(54) ATTACHABLE GROMMETS FOR HANGING PIPES

(76) Inventor: John Hennon, Wall Township, NJ (US)

(*) Notice: Subject to any disclaimer, the term of this patent is extended or adjusted under 35 U.S.C. 154(b) by 0 days.

(21) Appl. No.: 12/815,738

(22) Filed: Jun. 15, 2010

(65) Prior Publication Data

US 2010/0308184 A1    Dec. 9, 2010

Related U.S. Application Data

(63) Continuation-in-part of application No. 12/481,016, filed on Jun. 9, 2009, now Pat. No. 8,596,589.

(51) Int. Cl.
*F16L 3/08* (2006.01)
*F16L 3/22* (2006.01)
*F16L 3/10* (2006.01)

(52) U.S. Cl.
CPC ............... *F16L 3/222* (2013.01); *F16L 3/1091* (2013.01)

(58) Field of Classification Search
CPC ............ F16L 3/13; F16L 3/222; F16L 3/1091
USPC ........... 248/67.5, 74.1, 74.4, 74.2, 62, 59, 65, 248/73; 138/106, 108, 113
See application file for complete search history.

(56) References Cited

U.S. PATENT DOCUMENTS

| | | | | | |
|---|---|---|---|---|---|
| 3,848,839 | A | * | 11/1974 | Tillman | 248/74.2 |
| 3,856,244 | A | * | 12/1974 | Menshen | 248/67.5 |
| 4,212,293 | A | * | 7/1980 | Nugent | 126/711 |
| 4,273,465 | A | * | 6/1981 | Schoen | 403/391 |
| 4,784,363 | A | * | 11/1988 | Brown et al. | 248/610 |
| 5,014,940 | A | * | 5/1991 | Sherman | 248/74.1 |
| 5,404,914 | A | * | 4/1995 | Ziu | 138/113 |
| 7,367,363 | B2 | * | 5/2008 | Friedline et al. | 138/106 |
| 2007/0295867 | A1 | * | 12/2007 | Hennon | 248/74.4 |

* cited by examiner

*Primary Examiner* — Todd M Epps
(74) *Attorney, Agent, or Firm* — Michael P. Kochka, Esq.

(57) ABSTRACT

The present invention relates to block style tube and pipe hangers which include polymeric grommets that are used as a dampener or insulator for hanging tubes and pipes and particularly to a post and port arrangement for securing and aligning the silicone grommets during initial mounting and placement. The grommets are typically two opposing symmetrical parts that together define a passage having an inner diameter which directly surrounds and supports the pipe or tube, the post and port arrangement provides a structure and method for connecting the polymeric grommet parts and supporting the grommets on the pipe or tube during installation of the frame and support structure. Each flat surface of the grommet parts is substantially sloped to prevent the collection of liquids, dirt or debris.

7 Claims, 9 Drawing Sheets

ATTACHABLE GROMMETS FOR HANGING PIPES

This application is a continuation-in-part and claims priority from U.S. patent application Ser. No. 12/481,016 filed Jun. 6, 2009.

FIELD OF THE INVENTION

The present invention relates to block style tube and pipe hangers which include plastic or silicone grommets that are used as a dampener or insulator for hanging tubes and pipes and particularly to a post and port arrangement for securing and aligning the polymeric grommets during initial mounting and placement. The grommets are typically two opposing symmetrical parts that together define a passage having an inner diameter which directly surrounds and supports the pipe or tube, the post and port arrangement provides a structure and method for connecting the polymeric grommet parts and supporting the grommets on the pipe or tube during installation of the frame and support structure. Each flat surface of the grommets is substantially sloped to prevent the collection of liquids, dirt or debris.

BACKGROUND OF THE INVENTION

Pipe and tube supports are known for their use in supporting piping systems in residential and commercial buildings as well as throughout numerous industrial manufacturing facilities, for example, food, dairy, beverage, chemical, personal care, bioprocessing, and pharmaceutical manufacturing industries. Many pipe hanging configurations have either an inner layer or an inner block made from some elastomeric material to provide some combination of dampening, shock absorption, and insulation. With respect to industrial facilities, especially those in which clean rooms, sanitary and sterile environments are critical to the manufacturing process, the known pipe supports are configured to have a smooth contact surface on the insert to prevent bacterial build up and other contaminants from collecting. Any flat surface on the pipe and tube support increases the potential for dust, debris, bacteria or cleaning solution to collect or puddle. It is for this purpose that hygienic/sanitary system designs call for limiting flat surfaces. Existing square or block style supports/hangers have opposing flat faces generally defined by the opposing front and back faces of inserts which directly support the pipe or tube. The two flat faces being the front and back substantially planar surfaces through which the line, i.e. piping or tubing, extends perpendicularly. When such square or block design supports are used to support horizontally run lines, the flat faces are generally vertically aligned with respect to the horizontal and thus liquids and debris and anything else is motivated downwards off the planar front and back faces by gravity. On the other hand, if the square or block design is supporting a vertically run line the flat faces are now substantially horizontal to a ground surface and at least the top, upwardly exposed face of the support/hanger creates an area where dust, debris and liquids can collect.

Block style hangers may use plastic or silicone grommets which define an inner diameter (I.D.) to directly support and encompass the outer diameter (O.D.) of a pipe or tube. The silicone or plastic grommets are themselves supported by a metal frame which is often welded to supporting structural steel or secured by threaded connections to a hanger. These block style hangers may be used individually or due to their substantially square or rectangular shape may alternatively be easily and efficiently stacked in a vertical relationship to provide an offset between multiple pipes arranged and mounted in parallel.

The grommets act as a dampening cushion or insulator to reduce vibration between the hardware and the supported utility. The pipes or conduits may also face thermal expansion and contraction as heated liquid or steam is forced through the conduit for steam cleaning and sanitization of the conduit or of a work area. The grommet forms a guide around the supported utility line permitting movement in a predetermined linear direction while restraining movement in other directions. The grommet parts define the molded I.D. which fits around the O.D. of the pipe, tube or conduit. The size of the I.D. in the grommet controls the amount of force required to allow the tube, pipe or conduit to slide through the grommets. A smaller I.D. creates a tight fit or an anchor and a larger I.D. creates a loose fit or a guide which allows the tube, pipe or conduit to slide along an axis. To restrict vibration of the pipe the grommet must be fit snugly around the pipe. In a square or block design, the grommet is often made of two pieces of symmetrical rigid plastic material and an inner diameter may be enlarged to snugly fit around the pipe. Wedges may then be inserted to loosen the fit of the insert around the conduit allowing for thermal expansion of the pipe. The insertion of wedges leaves spaces that may act as collectors for dust and debris. A loose fit from incorrectly sized or installed wedges may also result in vibration of the pipe or conduit which may cause a rupture of a pipe connecting flange or ferrule connecting two pipes which may allow hot steam of liquid to spew from the pipe causing a safety hazard.

The known grommets and inserts for such hangers are held together and in place around the pipe or conduit solely by the use of mounting hardware and framework or brackets that attach the grommets to one another around the pipe or conduit. This creates a problem for the installer since the grommets must be both held in position by the installer, usually by hand, relative to the pipe or tube, and also in respect to one another while the hardware and framework are installed. Also, because the grommets are not secured together, the sliding of the pipe or tube can cause shifting of the grommet parts relative to one another and with respect to the mounting hardware and framework.

U.S. Pat. No. 4,270,250 to Schon discloses an improved clamp for tubular members that use interchangeable elastomeric or polymeric inserts. Schon '250 provides a way for the inserts to attach to a clamping block, but does not provide a way for the inserts to attach to the tube. Furthermore, the clamping block can only be attached by using external fastening devices.

U.S. Patent Application No. 2005/0205722 A1 to Krueger discloses a pipe and tube support that claims a swivel style mounting point along a vertical axis with an opening having a single bolt capture and opposing hinge placed at a 90° angle off of the vertical axis. The Krueger '722 support also has upper and lower dome-shaped housing sections with internal liners for holding the pipe. The internal liners are attached to the hardware used for hanging the pipe and do not provide an efficient way to secure the liners together and to attach the liners to the pipe.

OBJECTS AND SUMMARY OF THE INVENTION

The present invention relates to block style pipe, tube and conduit supports that provide a way to attach around a pipe, tube, or conduit. The invention has opposing grommets of a polymeric material, such as plastic, silicone, or PVC, that attach to each other around a pipe. A further embodiment has a single grommet of an elastomeric material, such as silicone, rubber, or some type of thermoplastic, that can be twisted and then slipped or placed around a pipe. The grommets are used to dampen and insulate the supported conduit in the hanger or support. The soft elastomeric material of the grommet restricts vibration while allowing for thermal expansion and contraction. The grommet material also grips completely around the pipe or conduit, removing gaps and a requirement to use wedges to tighten the fit or to resize the inner diameter of the grommet. The removal of gaps and wedges removes collection surfaces that could accumulate dust or debris.

The grommet inserts also function as a guide allowing for line expansion and contraction while producing a snug fit that greatly reduces vibration of the conduit. The present invention also uses a small elastomeric, polymeric, foam, rubber or even a metal or steel receiver disc formed to fit within a threaded receiver of a nut. The disk material is selected to match the supports/hangers applications environment. The receiver disc is forced to the bottom of the receiver by the insertion of the bolt and provides essentially a spring bias to the bolt which allows the bolt inserted into the receiver to bottom out against the disc surface and compress the disc against the bottom of the receiver. The disc provides axial spring bias between the bolt and the receiver for controlling axial expansion and contraction which can affect the threaded radial and axial relationship of the bolt and receiver. The elastomeric disc helps prevent loosening, or backing out, of the bolt while ensuring that the bolt is stopped and not over-tightened so that the grommet does not squeeze the pipe or tube too tightly while allowing the expansion or contraction of the supported utility line. The elastomeric disc allows the bolt to seal against the disc and compress the disc in the receiver and create an internal biasing effect like that of a common external lock-washer which ensures that a continual snug fit of the grommet insert around the pipe or conduit is maintained, while ensuring there is sufficient room for the pipe, tube or supported line to expand and contract while also greatly limiting pipe vibration and reducing the safety hazard of separation of a pipe support.

During installation, once the grommets are either attached to each other or twisted and placed around the tube, pipe or conduit, the accompanying hardware can be installed more efficiently because the installer does not need to manually hold the grommet parts together and in place while the mounting framework is installed. With the grommets or singular grommet block self-supporting itself on the pipe, and with the bolt holes through the grommets aligned, the installer can use both hands to install hardware, framework and supporting brackets for the grommets and pipe supports. The block shape of the invention allows the grommets to be stacked on top of each other, allowing the invention to be used for hanging multiple pipes. This invention works with pipes, tubes, and conduits of all different standards, such as ASME, ANSI, ASTM, and others.

In a further embodiment of the grommet to reduce or completely eliminate any flat or horizontal surfaces that may collect debris, the top plate and the planar face surfaces of the grommet insert may be formed with a raised geometry such as in a cone or pyramid shape. The raised geometry will facilitate the drainage of dirt, debris or liquids. The raised surface portions of the face may gradually slope from a highest point downwards towards the outer sections of the top of the hanger/support, for example, the planar surfaces defining each face of the grommet insert may slope down and outwardly from the generally circular edge defining the opening for the conduit or line, to the outer edges of the grommet thereby eliminating horizontal surfaces when the grommet is mounted in a horizontal configuration for a vertical line, pipe or conduit.

An object of the present invention is to simplify the total installation of a pipe hanger by allowing the grommets themselves to attach to each other or twist around a pipe, without having to rely on external mounting hardware or brackets to maintain the connection of the grommet(s) to the pipe during installation.

Another object of the invention is to provide a means of attaching two pipe hanger grommets to each other and around a pipe by utilizing a post and port system that creates a compression fit due to the relative sizes of the post and port. The post and port shapes can be smooth, ribbed, barbed, etc. such that the fit inside of the port is secure and keeps the grommets attached to each other without assistance.

A further object of the present invention is to provide a means of attaching a grommet around a pipe by utilizing a grommet block made from a flexible material that has a split in one side to allow the block to be twisted and slipped or placed around a pipe.

A still further object of the invention is to properly align the grommet bolt holes when connected to allow the metal hardware to attach properly and easily each time the present invention is used.

A yet still further object of the invention is to provide a more efficient and safer method for installing pipe hangers since the present invention frees up a hand that would otherwise be used to hold the grommet block. Having the grommet block already on the conduit without the requirement to hold it in place while installing the metal hardware saves time and helps prevent the hardware from falling while it is being installed.

Another object of the invention is to act as either an anchor or a guide for supported pipes. In an application of this invention as an anchor, the installation of the invention will provide a snug fit around the supported conduit. An anchor or snug fit will prevent essentially all pipe rotation or displacement at the point of application. When this invention acts as a guide, the installation of the invention will provide a loose fit around the supported conduit. A guide or loose fit will permit pipe movement in a predetermined linear direction while the post and port structure ensures that pipe movement does not alter the grommet alignment or support in the framework or bracket. The material chosen for the grommet can help provide the desired properties to facilitate either the anchor or guide configuration.

A still further object of the present invention is the purpose of acting as a dampening cushion between the suspension assembly (consisting of an attachment to a ceiling, wall or other support and a rod or extension that attaches to the grommet block hardware) and the supported pipe, tube, or conduit. The invention is of a plastic or silicone material that supports the conduit inside. Further, the invention also acts as an insulator between the hardware and the supported pipe, tube, or conduit since the grommets are made from a nonconductive material.

A still further object of the present invention is a pipe supporting apparatus having a grommet block having an upper grommet and a lower grommet that defines a pipe passage therebetween and at least one post provided on one of the upper and lower grommets, at least one receiving port provided on the opposing corresponding one of the upper and lower grommets for receiving the at least one post, at least one bolt hole extending through the upper and lower grommets; and wherein the post and port are provided with a mating friction fit so that the upper and lower grommet blocks can be removably secured to one another without any corresponding hardware or support.

A still further object of the present invention is a pipe supporting apparatus having an elastomeric or polymeric grommet block having a pipe passage formed therein, the grommet block having a first flange and a second flange flexible about a torsional axis to provide separation between a matingly engageable surface of the first and second flange; at least one bolt hole extending through the grommet block; and wherein the separation of the first and second flange allows the elastomeric or polymeric grommet and the pipe passage to be positioned about and encompass a conduit.

Another object of the invention is the restriction of vibration by using an, elastomeric, disc or similar springably biased disc between the bolt and receiver that allows expansion and contraction of the pipe conduit without compromising the secure threaded fit between the bolt and receiver nut.

Another object of the present invention is a snug yet yielding fit and seal of the grommet around the conduit removing the requirement of wedges or inserts to tighten the fit.

Another object of the present invention is to control the amount of compression of the elastomeric grommet around the pipe or conduit by using elastomer or metal inserts to bottom out the connecting bolts.

Another object of the present invention is the elimination or reduction of all flat or horizontal sections of the grommet and support hardware to facilitate drainage of dirt, debris or liquids.

A further object of the present invention is a gradual slope, cone, pyramid or rounded shape on the top section of the grommet and hardware support permitting drainage of dirt, debris or liquids.

A further object of the present invention is a gradual slope, cone, pyramid or rounded shape on each of the planar face sections of the grommet insert permitting drainage of dirt, debris or liquids.

A still further object of the present invention is a pipe supporting apparatus comprising a grommet block having an upper portion and a lower portion that define a pipe passage extending from a front face of the grommet block to a back face of the grommet block and wherein each of the front and back face of the grommet block being defined by a sloped surface extending radially outwardly from an inner edge of the grommet block towards an outer edge of the grommet block.

The invention will now be described, by way of example only, with reference to the accompanying drawings, of which:

BRIEF DESCRIPTION OF THE DRAWINGS

FIG. 2a shows an inset of the planar end surface and connection points of the grommet of the present invention;

DETAILED DESCRIPTION OF THE INVENTION

Figure 1:
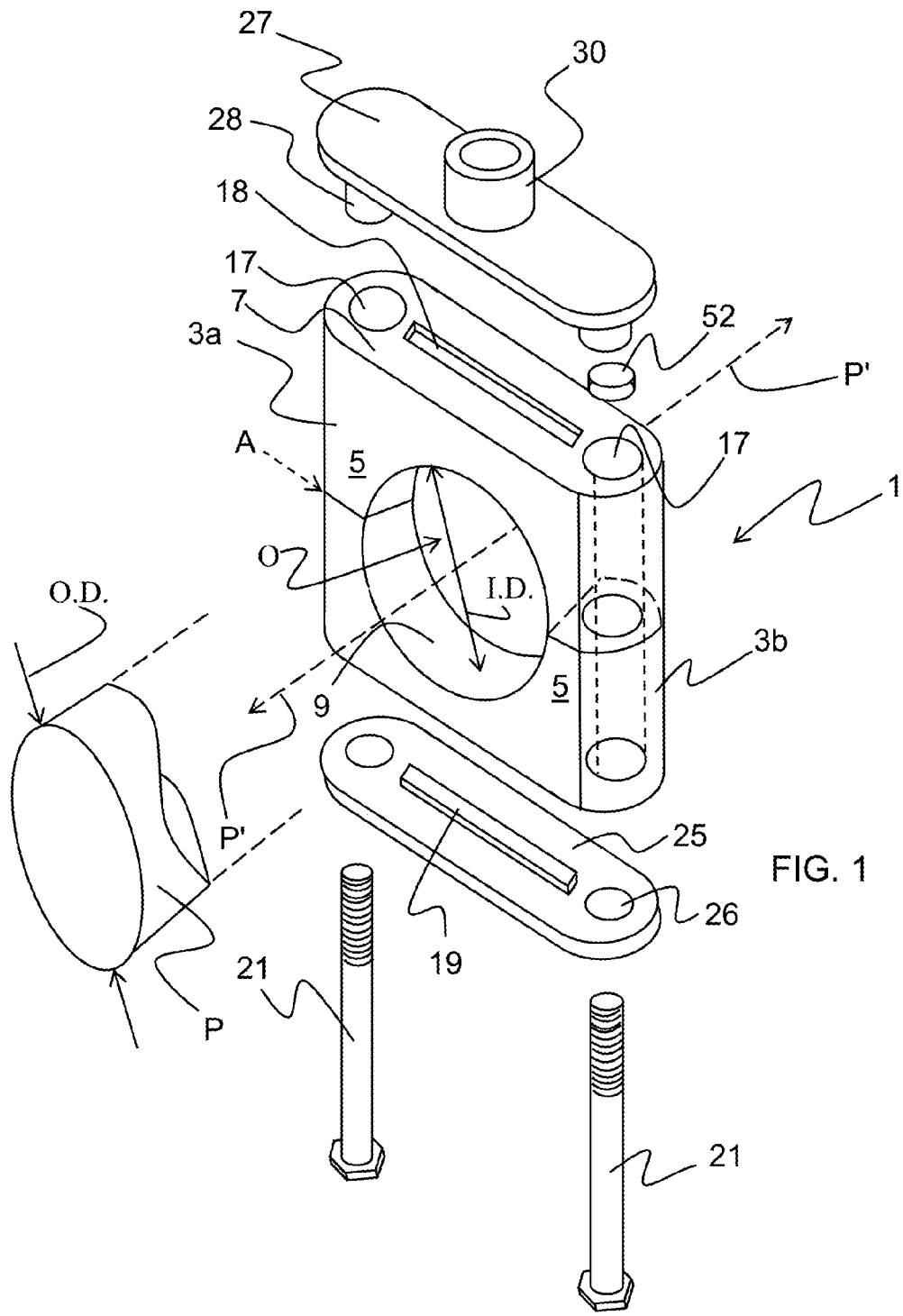
FIG. 1 shows an exploded isometric assembly view of the grommet block and framework.

In general, the present invention relates to a block style pipe and tube support including a grommet block 1 as shown in FIG. 1. The block 1 consists of two attached and substantially identical upper and lower grommets 3 defining a pipe passage O having an inner diameter (I.D.) through which a pipe, tube or conduit P having an outer diameter (O.D.) can pass. The two grommets 3 are attachable, and also separable, along a grommet separation plane A. The O.D. of the pipe can be accommodated by a range of I.D.'s of the grommet block depending on how secure the pipe is to be supported and held by the support. The tighter the tolerance of the pipe O.D. and the grommet block I.D. the more securely the pipe is held and the greater reduction in vibration of the pipe. It is to be appreciated that with a larger tolerance the pipe is more inclined, or permitted, to move or slide axially generally along a pipe axis P' in the pipe passage O. The grommets 3a, 3b can be modified to allow for different pipe sizes, tolerances etc., so that the pipe, tube, or conduit P is either securely held in the pipe passage area O or in the case of a loose fit, the conduit is guided essentially linearly along the pipe axis P' through the pipe passage O.

The grommets 3 have bolt holes or channels 17 that extend through the grommets 3a, 3b in a substantially perpendicular alignment to the pipe axis P' extending through the passage O. To this end, each grommet 3 is comprised of a pair of oppositely disposed legs 5 through which a bolt hole 17 is formed, a substantially flat top surface 7 against which a portion of the framework is generally secured, a curved inner surface 9 defining the I.D. of the passage O and each leg 5 has a substantially planar end surface 11 best shown in FIG. 2 for matingly engaging with a corresponding planar end surface of another grommet. The top surface 7 of each grommet 3 may be provided with a detent or slot 18 for receiving a corresponding protrusion or key 19 formed in an attachment plate 25, 27, or even another grommet. Such a detent or slot 18 and protrusion or key 19 would facilitate maintaining alignment of the bolt holes 17 of grommet 3 with holes 26 in the attachment plate 25 as set forth in further detail below. The union of detent 18 and the protrusion 19 could also form a compression fit or some other means of attachment to enable connecting of the attachment plates 25, 27 to the grommets 3 until a bolt 21 can be inserted through the attachment plate hole 26 and the bolt hole 17 of the grommet and be secured to a threaded receiver 28 of the corresponding attachment plate. It is also important aspect of the present invention that the receiver 28 has an O.D. that is sized to be manually press fit, or friction fit inside the bolt hole 17 of the grommet so that the grommet can hang, i.e. be attached without manual or tool assistance, to the upper attachment plate 27 as shown in FIG. 1. This allows a person assembling the hanger to push the grommet into frictionally engaged attachment with the upper attachment plate 27 and not have to use their hands to maintain the grommet attached thereto while other parts of the hanger are assembled, such as the bottom attachment plate 25.

The attachment plates 25, 27 form a framework that consists of a pair of the bolts 21 which extend through the attachment plate holes 26 and bolt holes 17 of the grommets 3 and connect and secure the attachment plates 25, 27 and grommets 3 together as shown in FIG. 1. During assembly, after passing through the holes 26 in the bottom attachment plate 25 and bolt holes 17 in the grommets 3a, 3b and coming out the other end, the bolts 21 connect to either the secured threaded receiver 28 in conjunction with the top attachment plate 27 or a nut supported on, or in conjunction with the top plate 27 to complete the assembly of the framework.

Also as shown in FIG. 1, a receiver disc 52 may be inserted in the receiver 28 to provide both axial spring bias to the bolt 21 preventing the bolt 21 from loosening and also to keep the bolt 21 from being over-tightened so that the supported pipe is not gripped too tightly by the grommet which could limit the thermal contraction and expansion of the supported pipe as described in further detail below. The attachment plate 27 includes a hanger attachment receiver 30 which may connect to a hanger rod (not shown) or a hanger rod may be welded to the attachment plate, as part of a suspension assembly which supports the pipe support and pipe to a floor, ceiling, wall or other structural feature in a facility. The top and bottom attachment plates 25, 27 are pulled essentially flush against the grommets' top surfaces 7 when the bolts 21 are tightened in the receiver 28 or nut.

Figures 4, 4A:
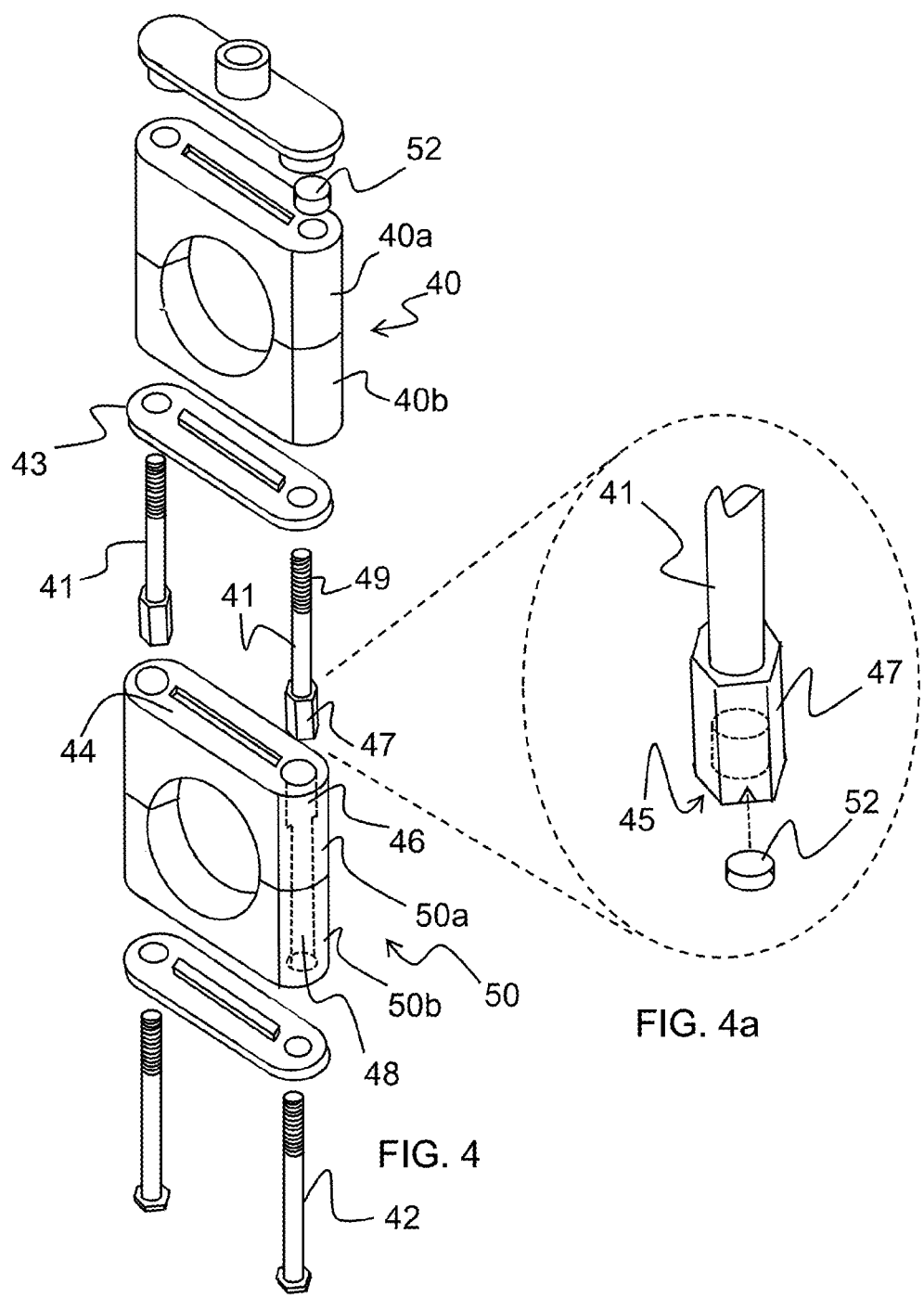
FIG. 4 shows an isometric assembly view of stacking the grommets of the present invention.
FIG. 4a shows an inset of the intermediate receiving bolt for connecting the stacked grommet blocks of the present invention.

The inclusion of a protrusion or key 19 in the attachment plates 25, 27 which corresponds to the detent or slot 18 on the surface of each grommet as discussed above not only aligns the grommet 3 with a respective top or bottom plate 25, 27 but also maintains grommets 3 in planar and axial alignment with the attachment plates 25, 27. This can be particularly helpful in preventing the pulling of the grommet 3 away from the framework along the pipe axis P' due to axial movement of the pipe as supported by the apparatus through the passage O. It is to be appreciated that pipes are subjected to both axial and radial forces from fluids and gases passing through the pipes. Axial forces in particular tend to move the pipe along its pipe axis P' in one direction or the other. In this manner the pipe P actually is intended to slide somewhat relative to the curved inner surface 9 of the opening O of the grommet block 1. When the pipe P does not completely slide along the curved inner surface 9, in other words, the pipe P may stick somewhat to the curved inner surface 9 by friction due to the weight of the pipe or, alternatively the tolerance of the opening O relative to the O.D. of the pipe, the axial force and movement of the pipe P can pull the grommets 3 in the axial direction and away from the attachment plates 25, 27. This is what is known as "creep", where the grommet block 1 tends to creep away from the supporting framework due to the axial forces of the pipe P. The slot 18 and protrusion 19 arrangement formed in the attachment plates 25, 27 and respective lower 3b and upper 3a grommets form a secure fit and connection between the attachment plates and the grommets preventing axial creep. The slot 18 and protrusion 19 arrangement also assist in appropriate alignment and stacking arrangements of the grommets 3 as seen in FIGS. 1 and 4. A further description of such stacking arrangements is provided below.

Figure 2:
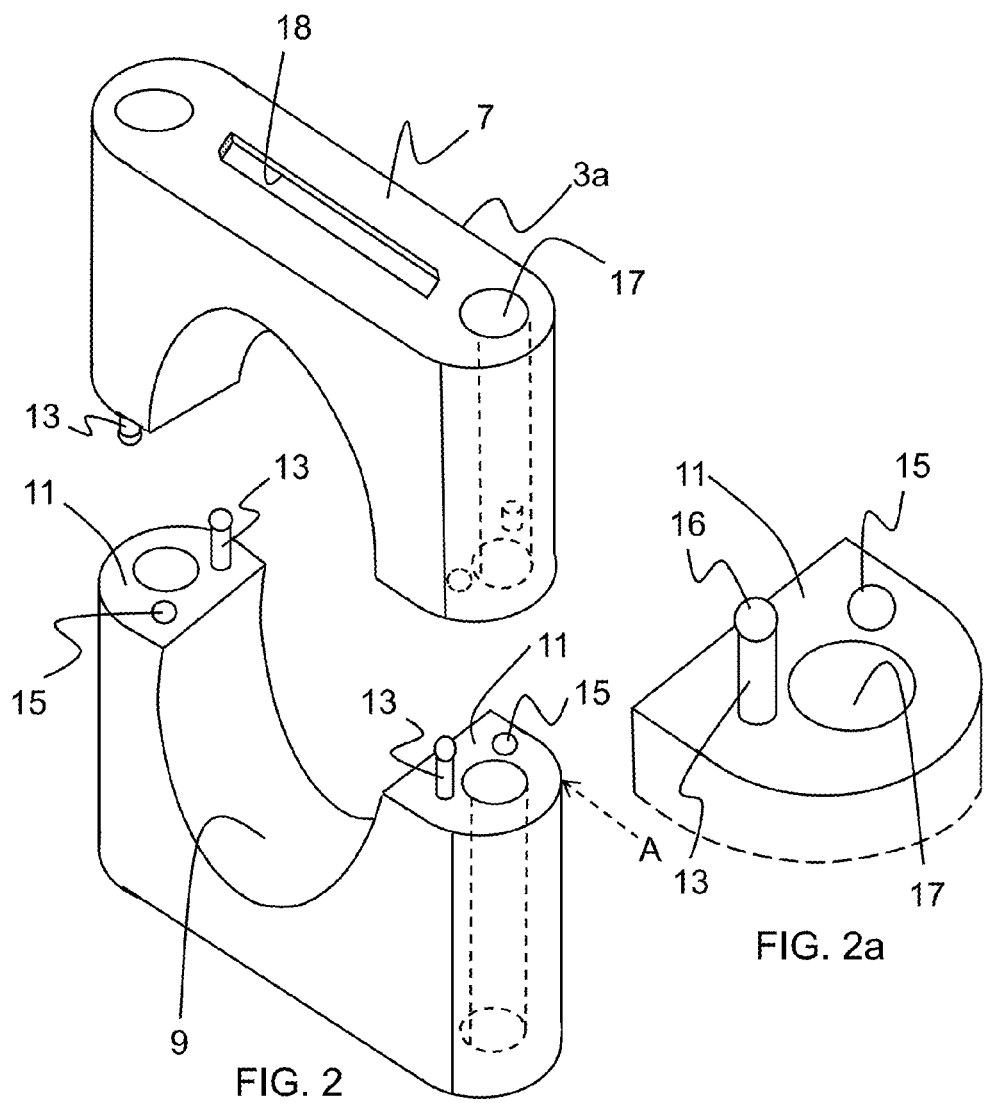
FIG. 2 shows an isometric view of the unattached grommets of the present invention.

FIG. 2 is an isometric view of the grommets 3 including the upper grommet 3a and the lower grommet 3b, separated from one another along the grommet separation plane A. As shown, the planar end surface 11 of each of the upper and lower grommets 3a, 3b illustrate a connection and stabilization system as to how the grommets 3 connect to form the stabilized grommet block 1, including in one embodiment a post 13 and port 15 on each of the planar end surfaces 11. The mating planar end surfaces 11 of the grommets 3 permit the upper and lower post 13 and port 15 of the grommets 3a, 3b to be essentially snap-fit and/or frictionally connected together in a manner that allows the grommet block 1 to hold together without the framework around it. Where the upper and lower grommets 3a, 3b are held together in this manner, the grommet block 1 can be self-supporting on and around a conduit without any additional hardware or attachment fixture. This aspect of the current invention—to simplify the installation and hanging process of the entire pipe hanger—is very important since the ability to connect the upper and lower grommets 3a, 3b around a pipe P so that the entire grommet block 1 is supported on the pipe or tube without any additional assistance from the installing personnel, frees the hands of the installer so that the installer can use both hands to complete attachment of the framework and the installation process.

The apparatus and method of the present invention also provides a safer process because it reduces the number of parts that the installer must concurrently handle and helps to prevent metal hardware from being dropped and falling. The simple attachment of the grommet block 1 to the conduit P without manual assistance after the upper and lower grommets 3a, 3b are fastened together by the respective post and port 13, 15 provides a stable situation for installing the accompanying hardware and framework. The connection of the two upper and lower grommets 3a, 3b is achieved through an interference fit, compression fit, snap fit or other frictional type connection between the relative posts and ports 13, 15. In one embodiment, the diameter of the ports 15 are made similar to, or even slightly smaller than the diameter of the posts 13 so that the posts 13 are securely and frictionally held after being inserted and pressed into the ports 15 due to the relative differences in diameters of the posts 13 and ports 15. This difference in relative diameter size of the posts and/or ports is such that an installer can, by manual force, push the posts 13 and ports 15 of the mating upper or lower grommet 3a, 3b into one another and form the grommet block 1 around the conduit P. This provides a secure and self-supporting connection for the grommet block 1 until the metal hardware of the framework is connected.

The attachment posts 13 can be made in any shape that would allow for a proper interference, friction or compression fit, such as smooth, ribbed, or even barbed. They can also be of any diameter or shape although cylindrical may be preferred. Similarly, the attachment ports 15 can be made in any corresponding size and/or shape that would provide a secure connection with the chosen posts 13. The posts 13 can also be made to allow easy initial alignment and entrance with the ports 15 by rounding or angling the free end 16 of the post 13 narrower than the rest of the post 13, as shown in FIG. 2a. The posts 13 and ports 15 should be sized such that there is a secure fit between the two upper and lower grommets 3a, 3b when pressed together and should provide sufficient frictional resistance so that the connection will not be lost unless some external force is applied, such as the manual force of the upper and lower grommets 3a, 3b being pulled apart. The height and depth of the respective posts 13 and ports 15 should be made in a relative manner so as to allow the connection surfaces 11 to touch when the upper and lower grommets 3a, 3b are fully engaged so that the metal hardware of the framework is readily attached and tightened on the grommet block 1.

Figure 3:
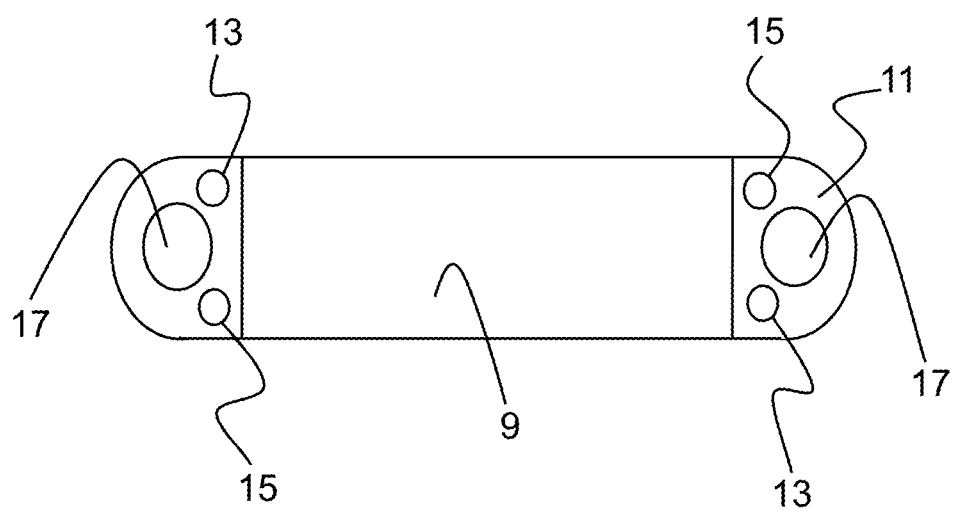
FIG. 3 shows a plan view of the connection points of the grommet of the present invention.

FIG. 3 is a planar view of the bottom of the grommet 3 of the present invention illustrating the location of the posts 13 and ports 15. One end of the grommet 3 consists of a post 13 and a port 15 equally and oppositely spaced in both distance and angle from the bolt hole 17. The opposite end of the grommet 3 consists of an oppositely disposed configuration of the post 13 and port 15. This view also shows that the arrangement of the post 13 and port 15 locations do not interfere with the bolt hole 17. The oppositely disposed configuration has the advantage of adding to the efficiency of connecting the grommets 3 to each other because the connection will work whether it is in the method shown in FIG. 2 or whether one of the grommets 3a, 3b is rotated 180 degrees.

FIG. 4 is a modified form of the present invention that takes into consideration the necessary stacking of grommet blocks with one another. In this embodiment an intermediate receiving bolt 41 and an intermediate frame plate 43 are provided to link the top grommet block 40 with a lower grommet block 50. The intermediate receiving bolt 41 is provided with a receiving cavity 45 in the head 47 of the intermediate receiving bolt 41 as shown in FIG. 4a for receiving the threaded end of a conventional bolt 42, or the threaded shaft of another intermediate receiving bolt 41. The inset grommet 50a of the lower grommet block 50 has a bolt head receiving cavity 46 within the bolt passage 48 for receiving the head 47 of the intermediate receiving bolt 41 to allow contiguous contact of the intermediate frame plate 43 with the upper surface 44 of the inset grommet 50a. In this way, any number of grommets blocks may be stacked together to accommodate the alignment and support of multiple pipes.

The bolts 41 must be securely tightened in each of the receiving cavities 45 to provide enough compression of the elastomeric material of the grommet to prevent the pipe P within the grommet 50 from vibrating. The vibration may occur as fluids flow through the pipe, or as pumps start and stop, valves open and close or other surges occur within the fluid conduit and may over time cause failures of flanges or pipe connectors causing a safety hazard. The pipe or conduit may also be subject to thermal expansion if used to deliver hot liquids or steam for sanitizing the inner surfaces of the conduit or other work areas. It is therefore important to both ensure that a secure fit is made around the supported pipe or conduit to secure against such vibrations without over-tightening the hanger i.e. the grommet, so that the pipe or conduit is not impeded from thermal expansion and contraction.

The elasticity of the grommet material under the correct amount of compression ensures that the ID of the grommet adheres to the pipe or conduit without allowing gaps to form between the conduit and ID of the grommet block 50. However, if the bolts 41 are over-tightened as is quite possible with an elastomeric or polymeric block, deformation of the grommet can occur as well as too much pressure from the grommet on the supported pipe or tube to permit appropriate thermal expansion. Alternatively, the thermal expansion and contraction could compromise the integrity of the grommet and hanger support eventually leading to failure.

As shown in FIG. 4a to properly secure the bolt 41 within the receiving cavity 45, an elastomer, polymeric, foam or metallic receiver disc 52 may be placed in the receiving cavity 45 to allow the end of bolt 41 to press into and against the biasing surface of the elastomer, polymer, foam or metallic 52. The bias of the disc 52 helps lock the bolt 41 within the receiver 45 and also acts as a stop preventing the over-tightening of the bolt 41 in the receiver 45. In this manner a sufficient tightening of the bolt 45 can occur so that the grommet grips entirely around the supported pipe or tube but ensures that the bolt 41 is not over-tightened so that the grommet is deformed or squeezes the pipe so tightly that thermal expansion is prevented. It is to be appreciated that this disc 52 may be another springable/compressible material besides an elastomer and does not have to be exactly circular as the disc, but must fit within the receiving cavity 45. The locking in of the bolt 41 in the receiver 45 keeps the elastomeric material of the grommet 50 compressed and snugly secured around the conduit reducing vibration effects on the pipe and tube support itself. The compression fit of the bolt 21, 41 by the bolt channels 17, 48 and elastomeric disc 52 aids in preventing the bolt and other hardware from falling out and into or on a work area or manufacturing process. The disc 52 also keeps the bolt from overtightening and limiting thermal expansion of the supported line. It is also to be appreciated that the same stop feature of the disc 52 can also be accomplished by ending or deforming the threads of the bolt 41 and receiving cavity 45 at a desired location so that no further threaded engagement of these elements can occur beyond a certain point. This feature is important in most industrial assembly line processes and critical in the food or drug industry for work area safety so that thermal expansion and contraction does not compromise and cause premature failure of the pipe supports.

Figure 5:
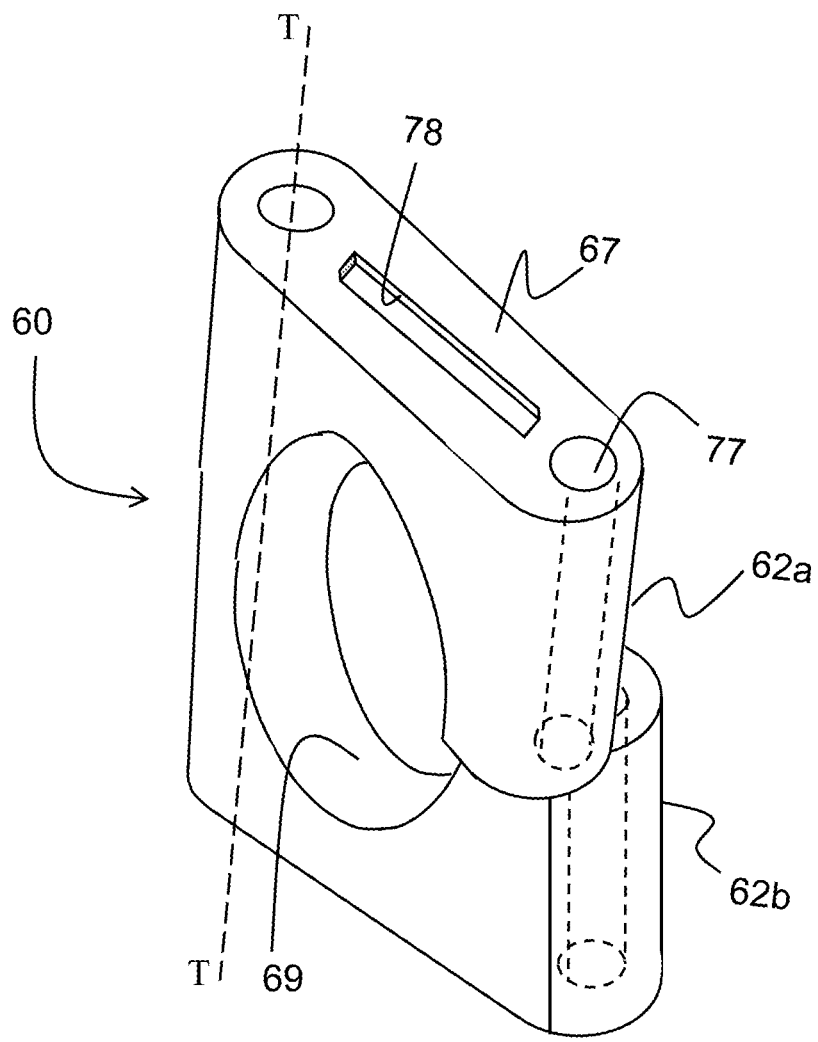
FIG. 5 shows an isometric view of the elastomeric grommet block in a flexed position about a torsional axis.

FIG. 5 is an isometric view of another embodiment of the grommet wherein the grommet is a single block made from an elastomeric material. In this embodiment, the elastomeric grommet block 60 can be flexed or twisted about a torsional axis T to provide a large enough separation between a first flange 62a and a second flange 62b to be able to fit the pipe passage O of the grommet block 60 around a pipe, tube, or conduit P. The grommet block 60 is of sufficient flexibility to separate and surround the pipe P, and of sufficient rigidity to reform to original dimensions and contours in order to securely grip around the pipe, tube or conduit P. In this way, after attachment of the grommet block 60, the bolt holes 77 are properly aligned to assist in the insertion of hardware to secure a framework to the grommet block 60 around the pipe P. Here, with a substantially more flexible elastomeric bock 60, there is a tremendous potential for creep due to the axial loads as explained above so the anti-creep cleat features 78 of the block 60 become increasingly important to ensure there is no failure of the grommet 60 and pipe support product.

In another embodiment of the present invention shown in FIGS. 6-10 a further improvement to the grommet is shown where flat face surfaces of the grommet 80 are replaced with a face surface 92 having instead a gradual slope away from the inside edge of the grommet 80 defining the circular opening O. The slope extends from a highest point at the inside edge 93 of opening O and radially outwards to a relative slightly lower point at the outside edges 94 of the grommet 80. The radially outwardly depending slope can be in the range of 0.5-10 degrees and other ranges which facilitate the run-off of liquid and debris. Better shown in FIGS. 7-8, from the inside edge 93 the face(s) 92 (shown here as top and bottom faces 92 and 92') the face 92 slopes radially outward and down from the opening O towards the outermost edges 94 of the grommet 80. The faces 92, 92' can also be described as truncated cones or conic sections with the smaller radius top of the cone being defined by the edge 93 and opening O and the base of the cone being essentially the outer edges 94 of the grommet 80. The radial slope depends circumferentially around the entire grommet, i.e. around the entire diameter of the opening O so that the entire surface defined by the faces 92, 92' are sloped from the opening O to the outer edges 94 of the grommet 80.

Figure 9:
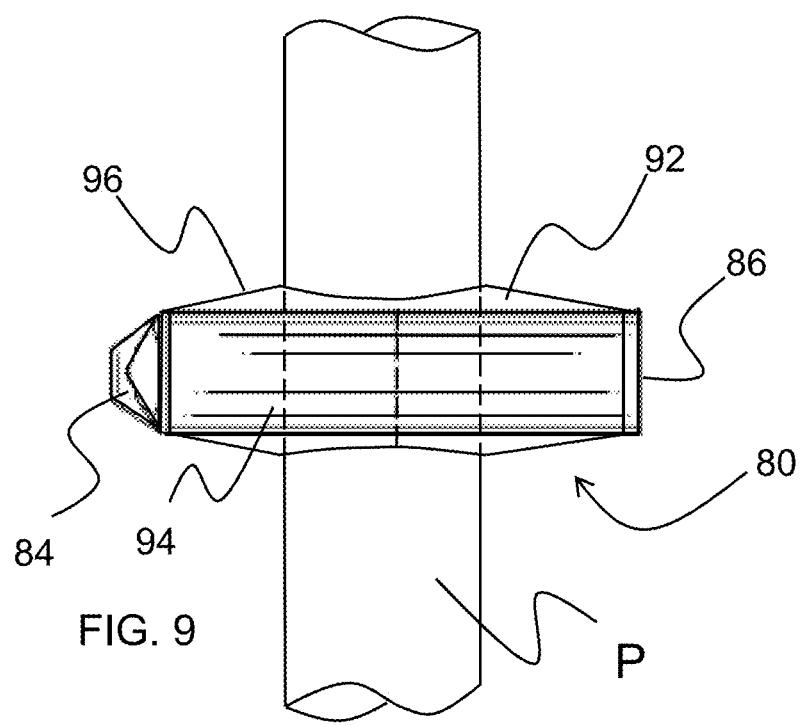
FIG. 9 shows a side view of the further embodiment with sloped features and a vertically aligned conduit.
Figure 10:
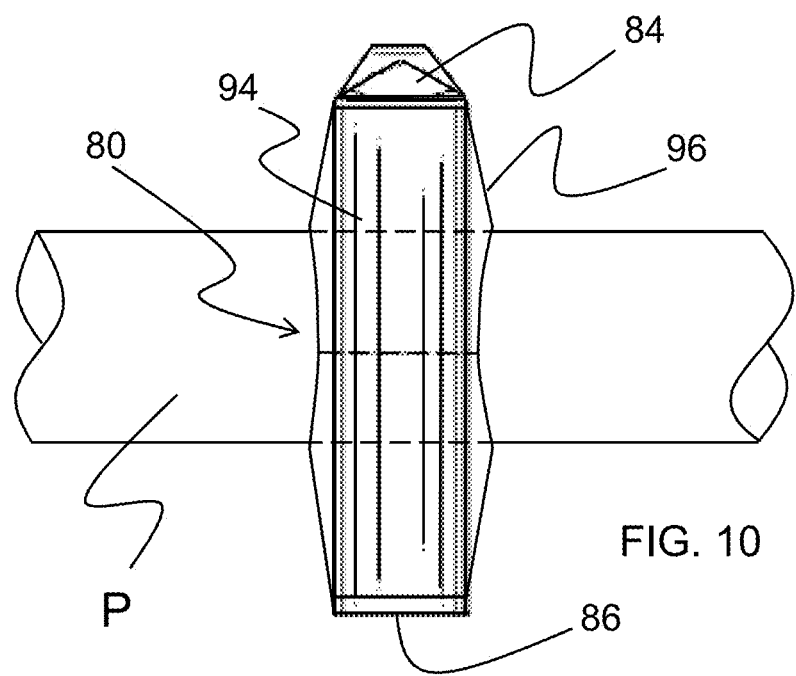
FIG. 10 shows a side view of the further embodiment with sloped features and a horizontally aligned conduit.
Figure 11:
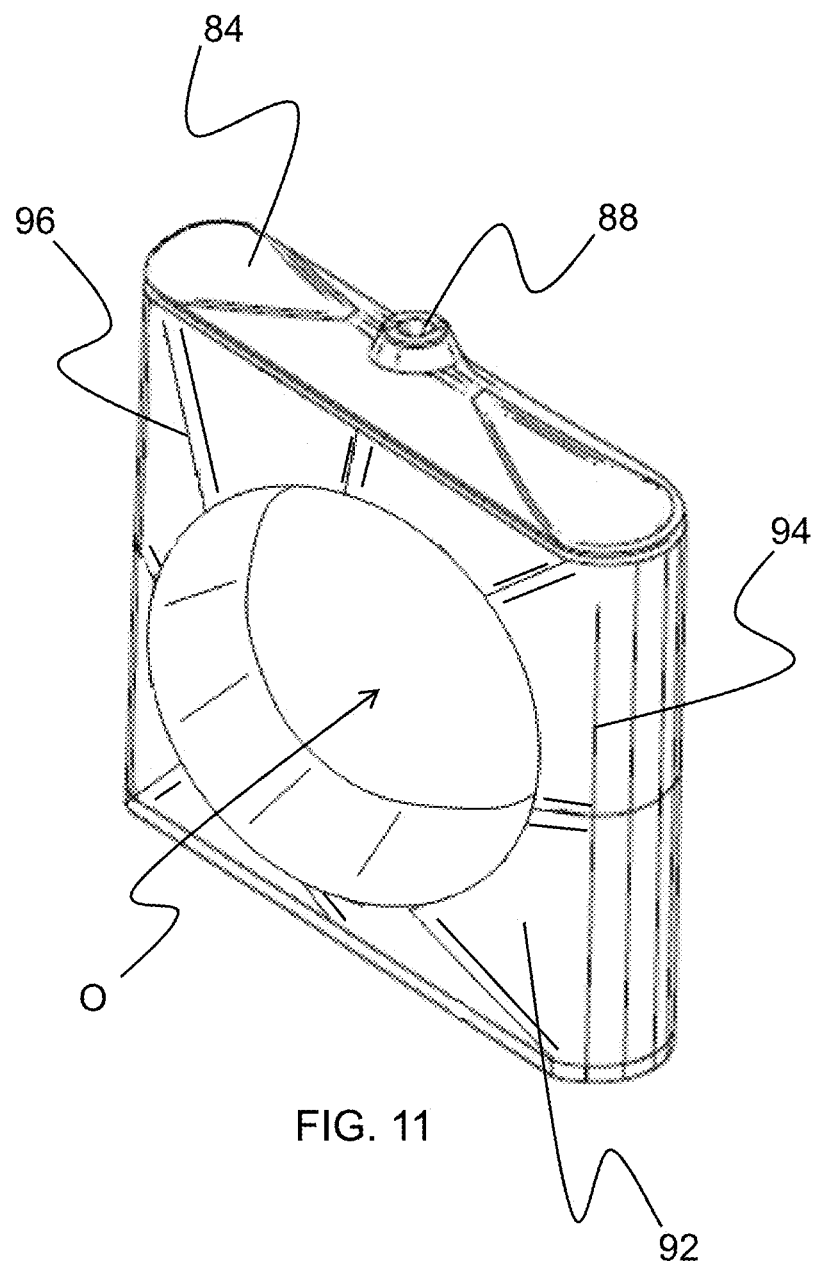
FIG. 11 shows a perspective view of the further embodiment having sloped features.

This arrangement is particularly important in cases where a vertical pipe or line is supported by the pipe support. In such cases as shown in FIG. 9, the pipe support and grommet 80 are substantially horizontally positioned to engage the vertical pipe P or line, so that one of the faces 92 is facing upwards and presents a surface which could hold liquid or other contaminants on the support. In other words, in supporting a vertical pipe P the horizontal face 92 of a flat faced grommet 80 may act as a collector for dust and debris, In the present embodiment however, by gradually sloping the face 92 away from the pipe passage opening O to the surfaces edges 94, liquid, dust and debris are directed away from the pipe P and off of the grommet surface 92. Critically, even in the case of a horizontally aligned pipe support as shown in FIG. 10, there are no flat, i.e. horizontal, surfaces which could hold liquid or contaminants. The surface 92 may be subdivided into one or more sections by forming subtle ridges 96 between each section or into channels to direct flow away from the conduit as shown in FIG. 11. The substantial removal of all flat surfaces from the grommet 80 allows the grommet to be positioned to support either a vertical or horizontal pipe or conduit without the collection of unsanitary debris.

Also in the embodiment shown in FIGS. 6-10, the attachment plates 84, 86 form a framework that is secured around the grommet 80 by the bolts which extend through the attachment plate holes 26 and bolt holes 17 of the grommets as previously described. Also as previously described the bolts 21 connect to a threaded receiver 28 (as shown in FIG. 1) on a bottom portion of the attachment plate 84. The attachment plate 84 may include a hanger attachment receiver 88 for connection to a hanger rod (not shown) as in FIG. 8, or there does not have to be such a receiver 88 as in FIG. 7 on the top plate 84. The receiver 88 may be threaded or may be merely a collar to which is welded a hanger rod. The top and bottom attachment plates 84, 86 are pulled essentially flush against the grommets' respective top and bottom surfaces when the bolts 82 are tightened in the receiver 28.

Figure 6:
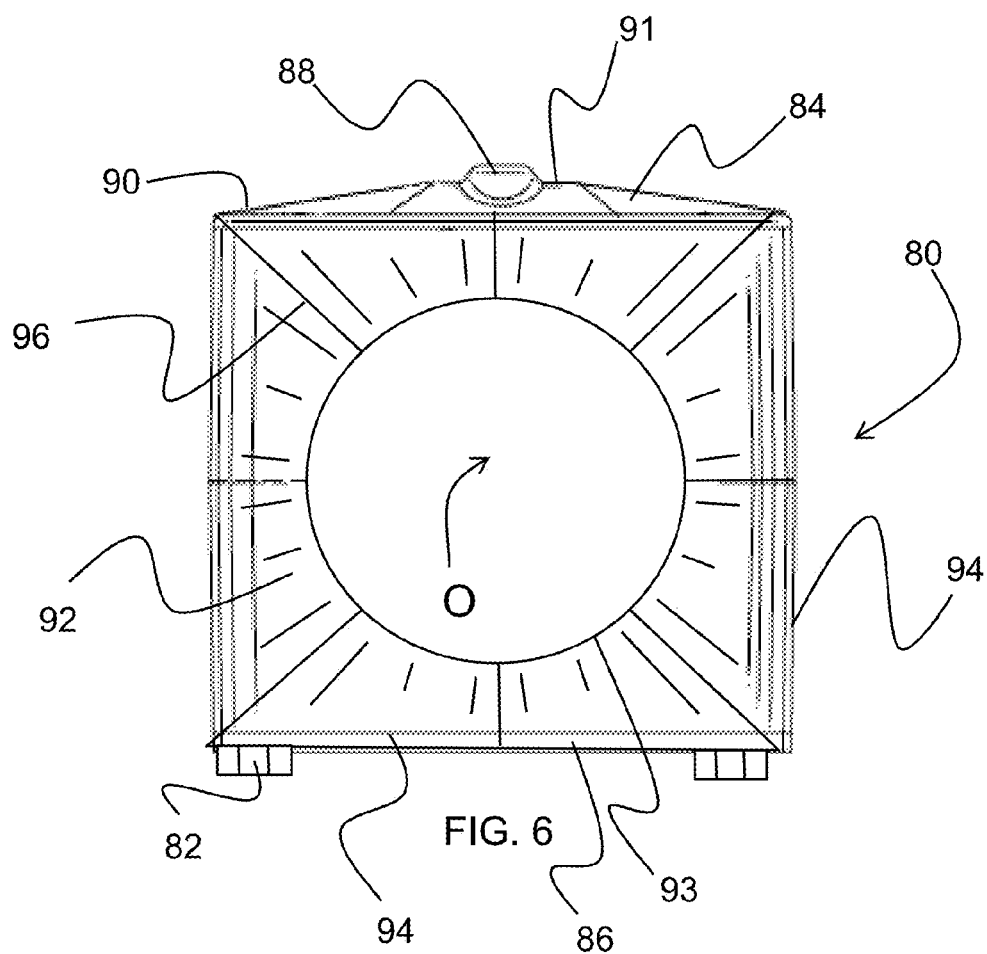
FIG. 6 shows a plan view of a further embodiment of the present invention having sloped features.
Figure 7:
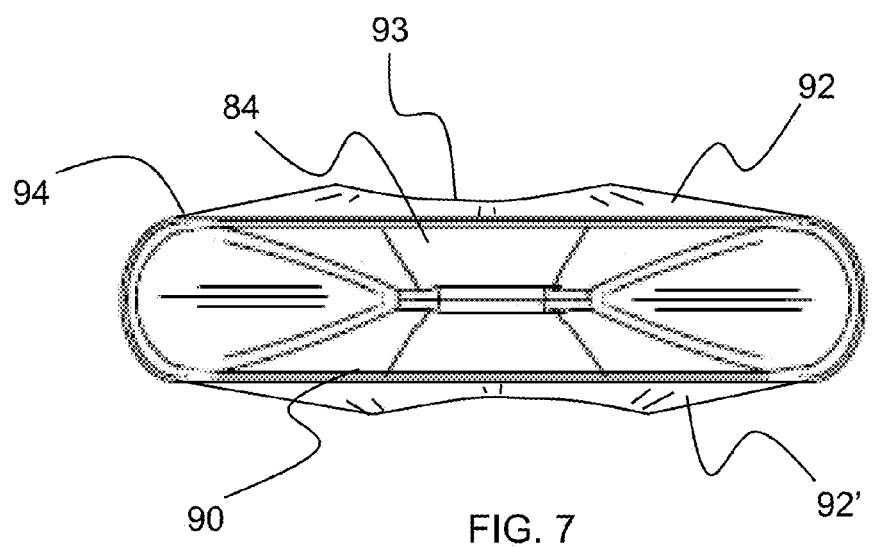
FIG. 7 shows a top view of the further embodiment with a substantially pyramid shape with sloped features.
Figure 8:
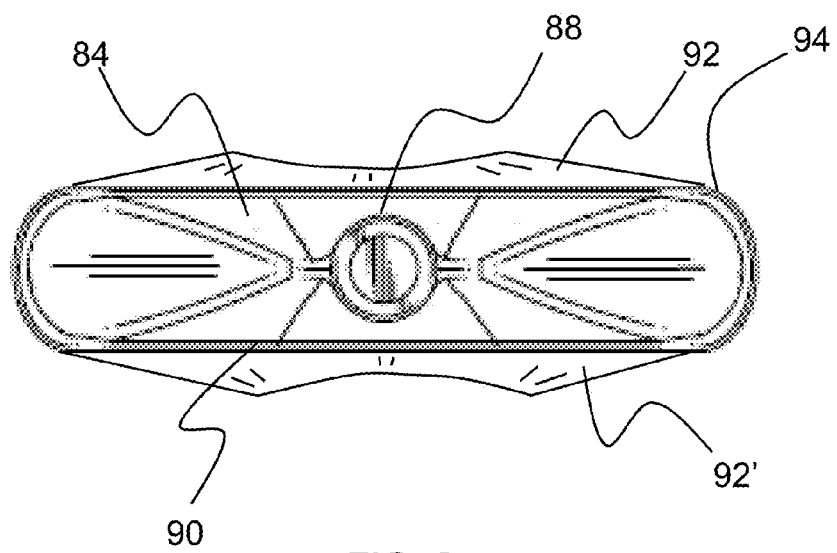
FIG. 8 shows a top view of the further embodiment with a substantially cone shaped with sloped features.

As best seen in FIG. 6, the top plate 84 which secures the grommet 80 between the top plate 84 and the bottom plate 86 of the grommet 80 is sloped to form a pyramid or cone shape that extends from a higher central portion 91, which may or may not have the receiver 88, downward to a lower outer edge 90 of the top plate 84. As described above, the center portion may form a support connector to hang the grommet support from a vertical or horizontal wall or ceiling extension. This slope or conical shape of the top plate 84 facilities the removal of liquid, debris and contaminants from the top surface of the top plate 84 which will more easily run off of the slope than a flat horizontal surface.

The invention has been described in detail with particular reference to certain preferred embodiments thereof, but it will be understood that variations and modifications can be effected within the spirit and scope of the invention.

I claim:

1. A pipe supporting apparatus comprising:
   a square grommet block having an upper portion and a lower portion that define a pipe passage extending from a front face of the grommet block to a back face of the grommet block, the grommet block having no flattened protrusions extending from an outermost edge of any side of the grommet block, the pipe passage comprising an inside edge;
   wherein each of the front and back faces of the square grommet block are defined by a raised geometry having a substantially pyramid shape continuously extending radially from the inside edge to outermost edges of the grommet block;
   and wherein the substantially pyramid shape comprises an outermost rim surrounding the pipe passage, wherein a portion of the outermost rim is concave.

2. The pipe supporting apparatus as set forth in claim 1 wherein a surface of each of the front and back faces of the square grommet block is contiguous around a diameter of the pipe passage.

3. The pipe supporting apparatus as set forth in claim 1 wherein surfaces of the opposing front and back faces form a thicker inner portion of the square grommet block at the inside edge defining the pipe passage and a relatively thinner portion of the square grommet block at the outer edge of the grommet.

4. The pipe supporting apparatus as set forth in claim 1 wherein a surface defining the front and back faces of the square grommet block further defines a conic section extending between a base adjacent the outer edge of the grommet block and a truncated apex at the pipe passage.

5. The pipe supporting apparatus as set forth in claim 1 wherein the square grommet block is positioned in a substantially horizontal alignment with the pipe passage defined about a relative vertical axis, a surface of the square grommet block entails no horizontal surfaces upon which a collection of liquid and debris can occur.

6. The pipe supporting apparatus as set forth in claim 1 wherein the square grommet block is supported between a top plate and a bottom plate and at least the top plate is provided with a sloped surface extending from a higher central portion to a relatively lower edge portion.

7. The pipe supporting apparatus of claim 6 wherein the top plate has a receiving cavity for receiving a bolt to secure the top and bottom plates about the square grommet and the receiving cavity provides for insertion of a springably biasing disc.

* * * * *